United States Patent
Frischeisen

(10) Patent No.: US 11,046,883 B2
(45) Date of Patent: Jun. 29, 2021

(54) COMPOSITE MATERIAL WITH PHOTOLUMINESCENT MATERIAL EMBEDDED IN A TRANSPARENT MATRIX

(71) Applicant: OSRAM GmbH, Munich (DE)

(72) Inventor: Jörg Frischeisen, Schwabmünchen (DE)

(73) Assignee: OSRAM OLED GmbH, Regensburg (DE)

( * ) Notice: Subject to any disclaimer, the term of this patent is extended or adjusted under 35 U.S.C. 154(b) by 382 days.

(21) Appl. No.: 15/742,445

(22) PCT Filed: Jun. 7, 2016

(86) PCT No.: PCT/EP2016/062912
§ 371 (c)(1),
(2) Date: Jan. 5, 2018

(87) PCT Pub. No.: WO2017/005436
PCT Pub. Date: Jan. 12, 2017

(65) Prior Publication Data
US 2018/0194996 A1    Jul. 12, 2018

(30) Foreign Application Priority Data
Jul. 6, 2015   (DE) ...................... 10 2015 212 595.5

(51) Int. Cl.
| C09K 11/02 | (2006.01) |
| C09K 11/77 | (2006.01) |
| C09K 11/66 | (2006.01) |
| G03B 21/20 | (2006.01) |

(52) U.S. Cl.
CPC ............ *C09K 11/02* (2013.01); *C09K 11/663* (2013.01); *C09K 11/774* (2013.01); *C09K 11/7734* (2013.01); *C09K 11/7739* (2013.01); *G03B 21/204* (2013.01)

(58) Field of Classification Search
CPC ... C09K 11/02; C09K 11/663; C09K 11/7734; C09K 11/7739; C09K 11/774; G03B 21/204
See application file for complete search history.

(56) References Cited

U.S. PATENT DOCUMENTS

| 6,507,049 | B1 * | 1/2003 | Yeager | ................... | C08G 59/68 |
| | | | | | 257/100 |
| 6,632,892 | B2 * | 10/2003 | Rubinsztajn | ........... | C08G 59/24 |
| | | | | | 257/E33.059 |
| 7,577,318 | B2 * | 8/2009 | Monch | ............... | C09K 11/7772 |
| | | | | | 385/1 |
| 2007/0273282 | A1 * | 11/2007 | Radkov | .............. | C09K 11/7734 |
| | | | | | 313/512 |
| 2008/0094691 | A1 | 4/2008 | Monch et al. | | |
| 2011/0215348 | A1 | 9/2011 | Trottier et al. | | |
| 2012/0261704 | A1 * | 10/2012 | Meyer | .................... | C09K 11/02 |
| | | | | | 257/98 |
| 2012/0280178 | A1 | 11/2012 | Mack et al. | | |
| 2014/0140071 | A1 * | 5/2014 | Daicho | ................ | C09K 11/715 |
| | | | | | 362/317 |

FOREIGN PATENT DOCUMENTS

DE    11 2011 100 435 T5    4/2013

OTHER PUBLICATIONS

Wu, Z. et al., "Preparation and thermally stable luminescence properties of a new blue $Sr_5Cl_{0.75}F_{0.25}(PO_4)_3$: $Eu^{2+}$ phosphor for WLEDs", *Journal of Alloys and Compounds*, Sep. 25, 2015, vol. 644, pp. 274-279.
Decision on Rejection issued by the China National Intellectual Property Administration on Jan. 14, 2021, of counterpart Chinese Application No. 201680040218.7, along with Articles and Rule of Law in the Decision in the English language.

* cited by examiner

*Primary Examiner* — C Melissa Koslow
(74) *Attorney, Agent, or Firm* — DLA Piper LLP (US)

(57) ABSTRACT

A composite material includes at least one photoluminescent material embedded as a light source in a transparent matrix, wherein a refractive index ($n_P$) of the at least one photoluminescent material and a refractive index ($n_M$) of the matrix differ by at most ±0.2.

13 Claims, 3 Drawing Sheets

COMPOSITE MATERIAL WITH PHOTOLUMINESCENT MATERIAL EMBEDDED IN A TRANSPARENT MATRIX

TECHNICAL FIELD

This disclosure relates to a composite material with at least one photoluminescent material embedded as a light source in a transparent matrix. The disclosure further relates to a display device with such a composite material and a method of operating such a display device.

BACKGROUND

In many daily applications it is desirable, where necessary, to be able to provide information such as logos, images, text and the like over a large area of shop window surfaces, the fronts of houses, vehicle windows and so on. In that case, it is moreover desirable for the surface on which the information is to be presented not to differ visually or only as little as possible when in the off state, i.e. when the information is not being displayed, from similar surfaces unsuitable for the display of such information. For example, it should as far as possible not be possible, in the switched-off state, to identify that a shop window pane is capable of such information display.

Hitherto, transparent organic light-emitting diodes (OLEDs) have predominantly been used as the luminescent composite material for those applications. Using such OLEDs makes it possible, for example, for a correspondingly equipped shop window pane to present information when the OLEDs are in the switched-on or excited state, but moreover to be at least partially transparent when the OLEDS are in the switched-off or unexcited state, i.e. partly transmissive to electromagnetic radiation in the region of the spectrum visible to the human eye of from around 380 nm to around 780 nm.

A disadvantage of currently available OLEDs is however considered to be the fact that use thereof is restricted to relatively small surface areas of markedly below 1 m². Furthermore, due the electrode layers needed, OLEDs reduce the transparency of support materials such as glass, acrylic polymer, plastics and the like to a comparatively significant degree. Thus, the area capable of light emission can be identified even when switched off and has an appearance which is frequently yellowish and milky, i.e. transparent only to a limited degree.

One known alternative to the use of OLEDs consists of projecting light onto a support material such as glass or the like which is provided with a scattering layer to purposefully scatter or reflect the incident light. The scattering layer may in that case cover a significantly larger area compared with OLEDs.

However, such scattering layers necessarily lead to major changes to visual appearance such that, for example, correspondingly equipped glass surfaces no longer appear transparent, but rather milky or translucent.

It could therefore be helpful to provide a luminescent composite material suitable for large-area display of information, that is at least substantially transparent at least in the switched-off or unexcited state, a display device with such a composite material and a method of operating such a display device.

SUMMARY

I provide a composite material including at least one photoluminescent material embedded as a light source in a transparent matrix, wherein a refractive index ($n_P$) of the at least one photoluminescent material and a refractive index ($n_M$) of the matrix differ by at most ±0.2.

I also provide a display device with at least one support element including at least one composite material including at least one photoluminescent material embedded as a light source in a transparent matrix, wherein a refractive index ($n_P$) of the at least one photoluminescent material and a refractive index ($n_M$) of the matrix differ by at most ±0.2, as a layer or constituent of a layer.

I further provide a method of operating the display device with at least one support element including at least one composite material including at least one photoluminescent material embedded as a light source in a transparent matrix, wherein a refractive index ($n_P$) of the at least one photoluminescent material and a refractive index ($n_M$) of the matrix differ by at most ±0.2 as a layer or constituent of a layer, including exposing the composite material arranged as a layer or constituent of a layer on the support element to electromagnetic radiation including at least one excitation wavelength of the photoluminescent material embedded as a light source in the transparent matrix.

DETAILED DESCRIPTION

Figure 1:
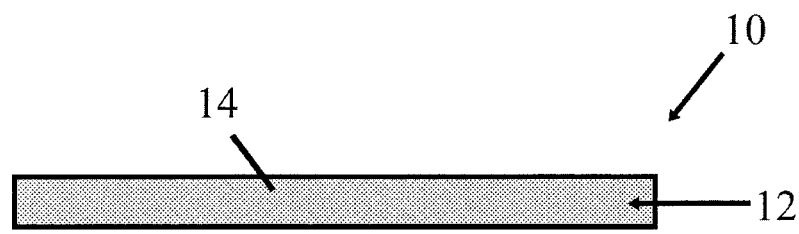
FIG. 1 is a schematic sectional view of an example of a composite material.

I provide a composite material comprising at least one photoluminescent material embedded as a light source in a transparent matrix, wherein a refractive index of the at least one photoluminescent material and a refractive index of the matrix differ by at most ±0.2. By selecting the transparent matrix such that its refractive index is close to the refractive index of the photoluminescent material, the composite material is virtually "invisible" with respect to light scattering, since light which passes through the composite material is accordingly not or only insignificantly scattered or reflected. The composite material is therefore transparent to incident electromagnetic radiation in the frequency spectrum visible to the human eye. Transparency means that the internal transmission of the composite material, i.e. transmission without taking account of Fresnel reflections at boundary surfaces, at 20° C. and with a layer thickness of 1 cm amounts to at least 0.8, in particular at least 0.9 and preferably at least 0.95 for light in the region of the spectrum visible to the human eye. The proportion by weight of the photoluminescent material or of the total of all the photoluminescent materials to the total weight of the composite material is in principle freely selectable between 0.1% and 99.9% weight percent and may amount, for example, to 0.1%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, 99.5% or 99.9%, wherein corresponding intermediate values should also be considered disclosed. The at least one photoluminescent material may in principle be fluorescent and/or phosphorescent. Likewise, the at least one photoluminescent material may in principle be a broadband phosphor, a linear phosphor or a mixture thereof. The matrix may in principle consist of one material or of a mixture of two or more suitable materials, wherein the material or materials of the matrix preferably do not photoluminesce in the region of the spectrum visible to the human eye. A difference of ±0.2 in particular means differences amounting, for example, to 0.20, 0.19, 0.18, 0.17, 0.16, 0.15, 0.14, 0.13, 0.12, 0.11, 0.10, 0.09, 0.08, 0.07, 0.06, 0.05, 0.04, 0.03, 0.02, 0.01, 0.009, 0.008, 0.007, 0.006, 0.005, 0.004, 0.003, 0.002, 0.001 or less, wherein corresponding intermediate values should also be considered disclosed. The amount of the difference in refractive indices is preferably as small as possible, in particular 0. It is thus possible on the one hand to excite the photoluminescent material by exposing it to suitable electromagnetic radiation to present information and, on the other hand, the composite material is at least substantially transparent when the photoluminescent material is in the unexcited state. By using the at least one photoluminescent material, it is additionally possible, unlike with OLEDs, to use the composite material for large-area presentation of information, since no electrode layers or the like are needed but rather it is merely necessary to excite the photoluminescent material by exposing it to light. In principle, the composite material may however naturally also be used merely for lighting purposes. In the simplest case, it is possible to use sunlight or daylight to expose the at least one photoluminescent material to light or to excite it. However, one or more artificial light sources or lighting devices may also be provided to excite the photoluminescent material. The composite material may therefore be put to particularly flexible use and scaled geometrically virtually as desired. Depending on the mechanical properties of the matrix and the geometric configuration, the composite material may additionally optionally be used alone, for example, as a luminescent glass pane replacement, or as a transparent coating on an additional support material.

An absorption maximum of the photoluminescent material may lie outside the region of the spectrum visible to the human eye. In other words, the photoluminescent material may have, at 20° C. and with a layer thickness of 1 cm, a maximum absorption of at most 0.25, in particular of at most 0.2 and preferably of at most 0.1 for light in the region of the spectrum visible to the human eye. Thus, the photoluminescent material is virtually non-absorbent in the visible region of the spectrum and therefore appears at least approximately colorless or white in the unexcited state such that the composite material may be configured not only to be transparent, but also to be colorless or at least substantially colorless. This allows a visually particularly unobtrusive configuration of the composite material when the photoluminescent material is in the unexcited state. It is, for example, possible to provide one or more photoluminescent materials that may be excited by radiation invisible or barely visible to the human eye such as, for instance, dark blue, violet, near UV or UV radiation and do not or do not appreciably impair the transparency of the composite material. A further advantage consists of the fact that excitation of the photoluminescent material may accordingly proceed unobtrusively.

The photoluminescent material may consist of particles having an average particle diameter of ≤400 nm, in particular of <100 nm and preferably <5 nm, and/or an average particle diameter of ≥800 nm, in particular of >10 μm and preferably >30 μm. By using particles with such particle sizes, the light scattering of the composite material may be reduced particularly significantly. It has in particular proven advantageous for the average particle diameters to be significantly smaller and/or significantly larger than the excitation wavelength(s) and/or the emission wavelength(s) of the at least one photoluminescent material. For example, the average particle diameters may be smaller and/or larger by at least one power of ten than the maximum or minimum excitation wavelength(s) and/or emission wavelength(s) of the photoluminescent material. In this respect, nanoscale photoluminescent materials have proven particularly advantageous.

Further advantages are achieved by selecting the at least one photoluminescent material from a group comprising inorganic phosphors, organic phosphors and quantum dots. In this way, the optical characteristics of the composite material may be adapted optimally to the respective intended purpose, in particular with respect to excitation and emission wavelength(s). Preferably, photoluminescent materials are used, alone or in combination, that scatter light in the composite material as little as possible in the region of the spectrum visible to the human eye. In addition to inorganic and organic phosphors, quantum dots are also suitable, in particular quantum dots with a core-shell structure which increase the Stokes shift between absorption and emission to the greatest possible extent.

The photoluminescent material may comprise at least one inorganic phosphor from the group $(M_{1-x}Eu_x)_{10}(PO_4)_6(Cl,F)_2$, in which M is selected from one or more elements from the group Sr, Mg, Ca and Ba and x=0.01-0.12, and the phosphors contain one or both of the elements in the parentheses;

$M_{1-y}Eu_yMgAl_{10}O_{17}$, in which M is selected from one or more elements from the group Ba, Mg, Ca and Sr and y=0.01-0.9;

$(M_{1-p}Eu_p)_6BP_5O_{20}$, in which M is selected from one or more elements from the group Sr, Mg, Ca and Ba and p=0.01-0.9;

$(Sr_{1-q}Eu_q)_4Al_{14}O_{25}$, in which q=0.01-0.9;

$Mg_4Ge_{1-r}Mn_r(O,F)_6$, in which r=0.001-0.06 and the formula can contain one or both of the elements in the parentheses; or $M_{1-s}Eu_s(Mg_{1-t}Mn_t)Al_{10}O_{17}$, in which M is selected from one or more elements from the group Ba, Mg, Ca and Sr, s=0.01-0.7 and t=0.05-0.5.

In the stated empirical formulas all values lying between the respective range limits are also to be considered disclosed. For example, the statement y=0.01-0.9 encompasses the values 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89 and 0.9 and corresponding intermediate values. As a further example, the statement of range r=0.001-0.06 encompasses the values 0.001, 0.002, 0.003, 0.004, 0.005, 0.006, 0.007, 0.008, 0.009, 0.010, 0.011, 0.012, 0.013, 0.014, 0.015, 0.016, 0.017, 0.018, 0.019, 0.020, 0.021, 0.022, 0.023, 0.024, 0.025, 0.026, 0.027, 0.028, 0.029, 0.030, 0.031, 0.032, 0.033, 0.034, 0.035, 0.036, 0.037, 0.038, 0.039, 0.040, 0.041, 0.042, 0.043, 0.044, 0.045, 0.046, 0.047, 0.048, 0.049, 0.050, 0.051, 0.052, 0.053, 0.054, 0.055, 0.056, 0.057, 0.058, 0.059 and 0.06. The compositions of the photoluminescent material(s) are described using empirical formulas. These each correspond to the nominal composition of the photoluminescent materials. The precise atomic ratios may actually deviate slightly from the stated ideal values. A possible value for such deviation is, for example, ±10%. It is likewise possible for the photoluminescent material to contain other further elements introduced, for example, by way of impurities or fluxes in the batch mixture or during synthesis, in particular (but not exclusively) boron and/or carbon and/or nitrogen and/or halogens such as, for example, fluorine or chlorine or bromine. Possible evaporation of individual components during synthesis may also lead to statistical underpopulation of individual positions. For reasons of clarity and simplification, these possible effects have not been mentioned explicitly every time in the stated empirical formulas. For example, the photoluminescent material may comprise one or more phosphors from the group $BaMgAl_{10}O_{17}$:Eu, $Mg_4GeO_{5.5}F$:Mn, $Sr_6BP_5O_{20}$:Eu and $Sr_4Al_{14}O_{25}$:Eu or consist of such an inorganic phosphor. In this way, the composite material may be formed without yellowish discoloration since all the stated inorganic phosphors are non-absorbent or at least do not absorb appreciably in the region of the spectrum visible to the human eye, but do however, after corresponding excitation, emit light in the region of the spectrum visible to the human eye. In particular, these inorganic phosphors absorb light substantially in the dark blue, violet, near UV or UV region of the spectrum, but virtually not at all in the blue, green, yellow or red region of the spectrum. Conversely, they do however emit in the blue, green and/or red region of the spectrum. By embedding one or more of these inorganic phosphors as photoluminescent material in the matrix of the composite material, the latter may be colorless in the unexcited state and virtually completely transparent. Conversely, the color emitted by the composite material in the excited state may be freely adjusted.

The matrix may comprise glass, silicone, plastics material, in particular polyacrylate, polymethacrylate, polymethyl methacrylate, polycarbonate, epoxy resin, formaldehyde resin, polyacrylonitrile, polyamides, polybutadiene, polyester, polyethene, polyurea, polypropene, polystyrene, polyurethane, polyvinyl chloride and/or polytetrafluoroethylene, ceramics and/or a nonmetallic hybrid polymer material. In this way, the composite material may be optimally adapted to its respective intended purpose without sacrificing transparency. Examples of suitable glasses are low-melting glasses, which may in principle contain lead or be lead-free. Examples of suitable lead-containing glasses are $PbO-B_2O_3$, $PbO-B_2O_3-ZnO$ and $PbO-B_2O_3-SiO_2$, while lead-free glasses may, for example, be selected from $Bi_2O_3-B_2O_3$, $Bi_2O_3-B_2O_3-ZnO$, $SnO-P_2O_5$ or $ZnO-B_2O_3$. It should however be emphasized that in principle other glasses and combinations thereof may also be provided as the matrix or a constituent of the matrix. Furthermore, nonmetallic inorganic materials produced using sol-gel processes such as for instance water glass, monoaluminum phosphate (MALP) or ceramic adhesives and/or nonmetallic hybrid polymer materials based on alkyl silicates such as for instance tetraethyl silicate (TEOS) may be used as the matrix or a constituent of the matrix. Alternatively or in addition, transparent silicones, organic plastics materials and/or ceramic materials are also suitable matrix materials. In the case of one or more ceramic matrix materials, the composite material, which may thus also be denoted phosphor ceramic, may be produced to be highly transparent and at least substantially free of pores.

Further advantages are achieved if the matrix comprises a filler material, by which the refractive index of the matrix is adjusted to a predetermined value. In other words, provision is made for the refractive index of the matrix to be finely adjusted through the admixture of one or more filler materials to get as close as possible or correspond exactly to the refractive index of the photoluminescent material. The at least one filler material may in principle be selected to be free of suitable compounds, wherein inorganic metal oxides such as for instance $ZrO_2$, $TiO_2$ or $Al_2O_3$ have proven advantageous due simply to their availability and chemical resistance. Preferably, the at least one filler material is also used in a form which does not impair the optical characteristics of the composite material, apart from the refractive index, or at least does so as little as possible. In particular, the at least one filler material may also be used in the form of particles with average particle diameters selected such that, as far as possible, they do not lead to any composite material light scattering. In this case too it has therefore proven advantageous for the average particle diameters of the filler material to be significantly smaller and/or significantly larger than the excitation wavelength(s) and/or the emission wavelength(s) of the at least one photoluminescent material. For example, the average particle diameters of the filler material may be smaller and/or larger by at least one power of ten than the maximum or minimum excitation wavelength(s) and/or emission wavelength(s) of the photoluminescent material. For example, the at least one filler material may also consist of particles having an average particle diameter of ≤400 nm, in particular of <100 nm and preferably <5 nm, and/or an average particle diameter of ≥800 nm, in particular of >10 μm and preferably >30 μm. In this respect, nanoscale filler materials have proven particularly advantageous.

I also provide a display device with at least one support element comprising at least one composite material as a layer or constituent of a layer. The support element may in this case in principle consist of the same material as the matrix of the composite material. Alternatively or in addition, the support element may consist of one or more different materials from the matrix of the composite material. The layer containing or consisting of the composite material may in principle be arranged on one side of the support element or on multiple sides of the support element. The support element may additionally be coated only in places or completely. The support element is preferably transparent, i.e. objects located behind the support element are at least relatively clearly visible, and the support element is thus at least largely transmissive to radiation in the visible spectrum. Alternatively, the support element may be translucent or opaque or non-transparent such that objects located behind the support element are not visible or are at least substantially not visible. The size of the display device may be scaled virtually as desired by extending the lateral size of the support element. In this way, the display device is also suitable for large-area lighting and large-area display of information, wherein at least the luminescent composite material is transparent or substantially transparent in the switched-off or unexcited state. Thus, virtually any desired support elements may be provided with the composite material, which is visually unobtrusive in the switched-off or unexcited state, as a layer or constituent of a layer and used for the illumination and/or display of images, text and other information by switching on or exciting the photoluminescent material in the layer. The layer containing the composite material may in this case be very thin and, for example, have a thickness of 2 mm, 1.9 mm, 1.8 mm, 1.7 mm, 1.6 mm, 1.5 mm, 1.4 mm, 1.3 mm, 1.2 mm, 1.1 mm, 1.0 mm, 0.9 mm, 0.8 mm, 0.7 mm, 0.6 mm, 0.5 mm, 0.4 mm, 0.3 mm, 0.2 mm, 0.1 mm or less. Provision may furthermore in principle be made for the composite material to be embedded as a layer or constituent of a layer in the support element. Further features and advantages thereof are revealed by the description of the composite material, wherein advantageous configurations of the composite material should be considered advantageous configurations of the display device and vice versa.

The support element may comprise at least one material from the group comprising glass, silicone, plastics material, in particular polyacrylate, polymethacrylate, polymethyl methacrylate, polycarbonate, epoxy resin, formaldehyde resin, polyacrylonitrile, polyamides, polybutadiene, polyester, polyethene, polyurea, polypropene, polystyrene, polyurethane, polyvinyl chloride and/or polytetrafluoroethylene, ceramics, wood, concrete, stone, metal and/or nonmetallic hybrid polymer materials. Using a transparent material means the support element may be transparent or at least translucent. Using non-transparent materials such as wood, concrete, stone, steel, metal and the like means conventional building materials may be advantageously coated with the luminescent composite material and configured as a display device. In this way, for example, house walls, fronts and the like may also be subsequently transformed into display devices that, when the composite material is in the switched-off or unexcited state, are visually unobtrusive and cannot or at least virtually cannot be distinguished from house walls not so equipped but, when the composite material is in the switched-on or excited state, are suitable for optionally large-area presentation of information. Through a suitable material selection, the display device may moreover adopt a particularly variable configuration and serve, for example, as a window, door, parapet or banister, ceiling or floor element, paneling, furniture or part of an item of furniture, mirror, part of a domestic appliance, display, head-up display and the like.

Further advantages are achieved in that the display device comprises at least two support elements. In this way, the display device may be configured with different layer sequences and optimally adapted to different applications. For example, the layer, which consists at least in part of the luminescent composite material, may be arranged between two support elements to protect the composite material from mechanical damage, environmental influences and the like. For example, the support elements may be transparent glass and/or plastics panes such that the display device may be configured as transparent double, triple or multiple glazing. Likewise, the display device may comprise a layer stack of two or more support elements and two or more composite material-containing layers. Provision may in principle be made for a luminescent composite material and a neighboring support element to lie directly against one another or be spaced from one another. For example, an air gap may be provided between a composite material and a support element. In addition to thermal insulation, this may in particular also improve light conduction in the composite material.

The display device may comprise at least two layers consisting at least in part of one or more composite materials according to a first example, wherein the at least two layers are arranged next to one another and/or above one another and/or on opposing sides of a support element and/or on different support elements. The display device may in this way be optimally adapted to its respective intended purpose. In particular, the use of different composite materials may provide regions with different emission or excitation wavelengths, so resulting in increased freedom with respect to the information presentation options. The display device may, for example, take the form of a display type capable of displaying multiple colors. If the display device comprises a red-, a green- and a blue-emitting composite material it may, for example, take the form of a type of RGB display.

At least one quencher and/or absorber may be provided by which light of the excitation wavelength(s) and/or the emission wavelength(s) of at least one photoluminescent material is to be absorbed. By at least one quencher and/or absorber, specific regions of the display device or of the support element may be equipped such that light of the excitation and/or emission wavelength of the respective photoluminescent material is at least partly absorbed. In this way, these regions of the display device may appear darker than luminescent regions without quenchers/absorbers. Examples of suitable quenchers are special phosphors doped with an activator such that they have a strong quenching effect for light of given wavelengths. Thus, only some regions of the display device are in a position to emit light, whereby it is possible particularly precisely to define the light-emitting region, for example, in the form of a symbol, a logo, text or the like. It is thus advantageously possible to dispense with a projector as light source. Instead, simple light sources such as, for example, a common laser or LEDs are sufficient to be able to present geometrically complex information. Any sufficiently light-absorbing material may in principle be used as an absorber. Provision may moreover be made for a transparent support element to be provided with an absorber and/or quencher on the opposite side thereof from the luminescent layer, to prevent light of given wavelengths from passing through the support element. Provision is alternatively or additionally made for at least one layer to take the form of an antireflective coating. Various advantages may be achieved using one or more antireflective coatings. When using excitation wavelengths in the dark blue, violet, near UV or UV range and in particular when using laser light, it must be ensured that there is no risk of eye damage from reflected or scattered light. An antireflective coating may provide a particularly simple way of ensuring safety of the display device in this respect. Likewise, potentially troublesome light reflections may be prevented, whereby the viewing angle of the display device may be improved. Furthermore, using a quencher or absorber and/or using an antireflective coating makes it possible purposefully to influence light propagation in the luminescent layer containing the composite material. The quencher/absorber may for this purpose itself be used as a layer or constituent of a layer and/or be arranged in the support material.

The display device may comprise means for injecting light into the photoluminescent material and/or at least one open- and/or closed-loop-controllable lighting device by which the photoluminescent material is to be excited. This enables a particularly high degree of flexibility with regard to the optionally spatially different excitation of the at least one photoluminescent material. If the display device comprises means for injecting light into the photoluminescent material, light propagation may be particularly well controlled, particularly high luminous efficacy achieved and troublesome light reflections at least largely prevented. Injection may here proceed in principle directly into the luminescent layer containing the composite material and/or into a light-guiding layer which transports the light to the luminescent layer containing the composite material. Use of an open and/or closed-loop-controllable lighting device enables the presentation of information by the display device to be modified particularly simply with regard to time and/or place.

The lighting device comprises at least one projector and/or at least one laser and/or at least one LED and/or is configured to emit light of different wavelengths. This allows excitation of the at least one photoluminescent material to be adapted to the respective configuration and the respective intended purpose of the display device. A projector, in particular an (ultra) short-range projector, may in this case in principle be arranged very close to the composite material, whereby the light propagation and the direction of the light used for excitation may be well controlled and undesired reflections avoided. Furthermore, use of a projector enables particularly simple time- and location-dependent exposure to light and/or excitation of the at least one composite material, whereby information may be presented in a correspondingly variable manner. The lighting device may in principle comprise one or more filters for filtering light of specific wavelength(s).

I also provide a method of operating a display device in which the composite material arranged as a layer or constituent of a layer on the support element is exposed to electromagnetic radiation, which comprises at least one excitation wavelength of the photoluminescent material embedded as a light source in the transparent matrix. The method enables information to be displayed over a large area by exposing the photoluminescent material of the composite material to light, wherein the light contains one or more excitation wavelength(s) suitable for the photoluminescent material. The light may in the simplest case be sunlight or ambient light, but it is also possible to provide one or more artificial light sources to excite the at least one photoluminescent material. When the photoluminescent material is in the switched-off or unexcited state, at least the composite material is substantially transparent and thus visually particularly unobtrusive. Further features and advantages thereof are revealed by the descriptions of the composite material and the display device, wherein advantageous configurations of those structures should be considered advantageous configurations of this structure/method and vice versa.

In addition, further features are revealed by the examples. The features and combinations of features stated above in the description and the features and combinations of features stated below in the examples or shown alone are usable not only in the respectively stated combination but also in other combinations or alone without going beyond the scope of this disclosure. Examples not explicitly shown and explained but are apparent and can be produced from separate combinations of features on the basis of the explained examples should also be considered to be included and disclosed. Examples and combinations of features which do not include all the features of an independent claim worded as filed should thus also be considered to be disclosed.

FIG. 1 is a schematic sectional view of an example of a composite material 10. The composite material 10 comprises a photoluminescent material 12 shown symbolically with dots, which is embedded as a light source in the form of particles in a transparent matrix 14. In this case, the absolute amount of the difference between a refractive index $n_P$ of the at least one photoluminescent material 12 and a refractive index $n_M$ of the matrix 14 is $|n_P-n_M|=0.01$. By matching the photoluminescent material 12 and the matrix 14 in this way, the composite material 10 is transparent and does not or substantially does not scatter incident light. In the example shown, a phosphor serves as photoluminescent material 12 that in the excited state emits light in the region of the spectrum visible to the human eye but does not or at least substantially does not absorb light in the region of the spectrum visible to the human eye such that the composite material 10 is not only transparent but also colorless, providing the photoluminescent material 12 is not excited. Thus, when the photoluminescent material 12 is in the switched-off or unexcited state the composite material 10 is visually particularly unobtrusive and may, for example, be indistinguishable from a normal glass pane or the like. Conversely, when the photoluminescent material 12 is in the switched-on or excited state the composite material 10 produces the impression that the light emitted by the photoluminescent material 12 is emitted directly by the supposed "glass pane". This constitutes a technical solution differing fundamentally from conventional approaches such as, for example, the use of milk glass or of OLEDs in which the luminescent surface has a milky, non-transparent or yellowish visual appearance when switched off.

It should however be emphasized that, in principle, non-white photoluminescent materials 12 may naturally also be provided if a colored appearance is desired or tolerated in the unexcited ("off") state. Many photoluminescent materials 12 may, for example, be excited by blue light (e.g. LEDs or lasers) and therefore have a non-white or colored appearance in the "off" state. For example, a YAG:Ce phosphor has a greenish or yellowish color in the "off" state because it absorbs blue light and emits green or yellow light. The refractive index $n_P$ of YAG:Ce amounts to around 1.83. If such a phosphor is embedded in a glass, a silicone matrix or the like with a refractive index $n_M$ of, for example, 1.5, the general appearance of such a known composite material is milky or opaque, i.e. only transparent to a very limited extent or even completely non-transparent, in the "off" state due to the large difference in the refractive indices $n_P$, $n_M$ and the associated strong light scattering.

Therefore, the matrix 14 is selected such that it is on the one hand transparent and on the other hand the amount of the difference $|n_P-n_M|<0.2$, i.e. the refractive index $n_M$ of the matrix 14 is as close as possible to the refractive index $n_P$ of the phosphor or of the photoluminescent material 12. In this way, the photoluminescent material 12 is virtually "invisible" with regard to light scattering since the phosphor particles do not or virtually do not scatter the light passing through the composite material 10. The transparency of the matrix 14 is therefore retained such that the entire composite material 10 is transparent. When a photoluminescent material 12 is embedded in a matrix 14 with at least approximately the same refractive index ($n_P$, $n_M$), the particle size and particle size distribution of the photoluminescent material 12 conventionally only plays a subordinate role.

To avoid a yellowish or otherwise colored appearance of the composite material 10, it has proven advantageous to use phosphors or photoluminescent materials 12 that do not or barely absorb visible light. For example, phosphors may be used that mainly absorb radiation in the dark blue or violet, the near UV or the UV region but not or barely in the blue, green, yellow and red region of the visible spectrum. Some examples of such photoluminescent materials 12 are $BaMgAl_{10}O_{17}$:Eu, $Mg_4GeO_{5.5}F$:Mn, $Sr_6BP_5O_{20}$:Eu and $Sr_4Al_{14}O_{25}$:Eu. By embedding one or more of these photoluminescent materials 12 in a matrix 14 with at least approximately the same refractive index $n_M$, the composite material 10 becomes at least virtually completely transparent and colorless. For switching-on or activation, the photoluminescent material 12 in the composite material 10 may be irradiated by a light source, suited to the respective absorption wavelengths, to cause photoluminescence in the visible region of the spectrum. Depending on the phosphor or phosphor mixture, the resultant light emission lies in different wavelength ranges of the visible region of the spectrum and may be perceived by the human eye.

In one example, in the excited state the photoluminescent material 12 emits a primary radiation in the red region of the electromagnetic spectrum and consists of a phosphor of the formula $(M_{1-x}Eu_x)_{10}(PO_4)_6(Cl,F)_2$, wherein M=Sr or M=Sr and one or more elements selected from a group comprising Mg, Ca and Ba, and the phosphors contain one or both of the elements in the parentheses. Preferably x=0.02-0.08, particularly preferably x=0.03-0.06. Preferably, M contains at least 50 mol % Sr, particularly preferably at least 70 mol % Sr, very particularly preferably at least 80 mol % Sr, in each case relative to the sum of Mg, Ca, Sr and Ba.

Moreover, the photoluminescent material 12 may be a phosphor of the formula $M_{1-p}Eu_p(Mg_{1-z}Mn_z)Al_{10}O_{17}$, wherein M=Ba or M=Ba and one or more elements selected from a group comprising Mg, Ca and Sr. Preferably p=0.05-0.6 and z=0.1-0.4, particularly preferably p=0.1-0.5 and z=0.15-0.35. Preferably, M contains at least 50 mol % Ba, particularly preferably at least 70 mol % Ba, very particularly preferably at least 80 mol % Ba, in each case relative to the sum of Mg, Ca, Sr and Ba.

In a further example, in the excited state the photoluminescent material 12 emits a primary radiation in the red region of the electromagnetic spectrum and consists of a phosphor of the formula $M_{1-y}Eu_yMgAl_{10}O_{17}$, wherein M=Ba or M=Ba and one or more elements selected from a group comprising Mg, Ca and Sr. Preferably y=0.1-0.6, particularly preferably y=0.3-0.6. Preferably, M contains at least 50 mol % Ba, particularly preferably at least 70 mol %, very particularly preferably at least 80 mol % Ba, in each case relative to the sum of Mg, Ca, Sr and Ba.

In a further example, the photoluminescent material 12 is a phosphor of the formula $M_{1-p}Eu_p(Mg_{1-z}Mn_z)Al_{10}O_{17}$, wherein M=Ba or M=Ba and one or more elements selected from a group comprising Mg, Ca and Sr. Preferably p=0.05-0.6 and z=0.1-0.4, particularly preferably p=0.1-0.5 and z=0.15-0.35. Preferably, M contains at least 50 mol % Ba, particularly preferably at least 70 mol % Ba, very particularly preferably at least 80 mol % Ba, in each case relative to the sum of Mg, Ca, Sr and Ba.

In addition to inorganic phosphors, other luminescent materials may also be used as photoluminescent material 12, provided they do not bring about excessive light scattering in the composite material 10. Examples of alternative photoluminescent materials 12 are organic dyes or quantum dots, in particular quantum dots with a specific core-shell structure which increases the Stokes shift between absorption and emission.

As a rule, an excited photoluminescent material 12 mainly produces a color, i.e. above all blue, green, yellow or red. The photoluminescent material(s) 12 may therefore be selected such that the composite material 10 emits light with a specific spectral emission, e.g. blue, green, yellow, orange or red, when exposed to light of a suitable excitation wavelength. Through a suitable selection of the photoluminescent materials 12, the color location of the emitted light may be optimally adjusted to the respective intended application.

To generate white light, a mixture of two or more photoluminescent materials 12 may be used, e.g. a blue and a yellow phosphor or a blue, a green and a red phosphor. It is also possible to combine a plurality of photoluminescent materials 12 such that white light is emitted with a color point at or near 2700 K, 3000 K, 4000 K, 5000 K, 6500 K, or the like. Accordingly, the color rendering index (CRI) is adjusted as a function of the photoluminescent materials 12 used.

Depending on the refractive indices $n_P$ of the photoluminescent materials 12, it may be necessary to use an individual matrix 14 for each photoluminescent material 12. If the photoluminescent materials 12 have the same or at least approximately the same refractive indices $n_P$ (±0.2 or less), it is also possible for two or more photoluminescent materials 12 to be embedded in the same matrix 14.

Common photoluminescent materials 12 conventionally have an average grain or particle size of around 0.5 µm to 30 µm. Thus, as a rule they scatter light in the wavelength range visible to the human eye. By using photoluminescent materials 12 which consist of particles with an average particle diameter markedly below or above their excitation wavelength, light scattering may be reduced significantly. Photoluminescent materials 12 may, for example, be used whose average particle diameter amounts to ≤400 nm, in particular <100 nm and preferably <5 nm, and/or ≥800 nm, in particular >2 µm, in particular >10 µm and preferably >30 µm.

The matrix 14 may in principle comprise any suitable transparent material or consist of such a material. Examples of suitable materials are glass, silicone, plastics material, in particular polyacrylate, polymethacrylate, polymethyl methacrylate, polycarbonate, epoxy resin, formaldehyde resin, polyacrylonitrile, polyamides, polybutadiene, polyester, polyethene, polyurea, polypropene, polystyrene, polyurethane, polyvinyl chloride and/or polytetrafluoroethylene, and/or nonmetallic hybrid polymer materials. It is also possible to use a ceramic material as the matrix 14 to obtain a type of phosphor ceramic which may in principle be produced to be highly transparent and at least largely free of pores. The refractive index $n_M$ of the matrix 14 may be finely adjusted by addition of one or more filler materials (not shown) and brought as close as possible to the refractive index $n_P$ of the photoluminescent material 12. Examples of suitable filler materials are metal oxides such as $ZrO_2$, $TiO_2$, $Al_2O_3$ or other suitable materials, which may optionally be nanoscale to prevent light scattering or other optical impairments to the composite material 10.

Figure 2:
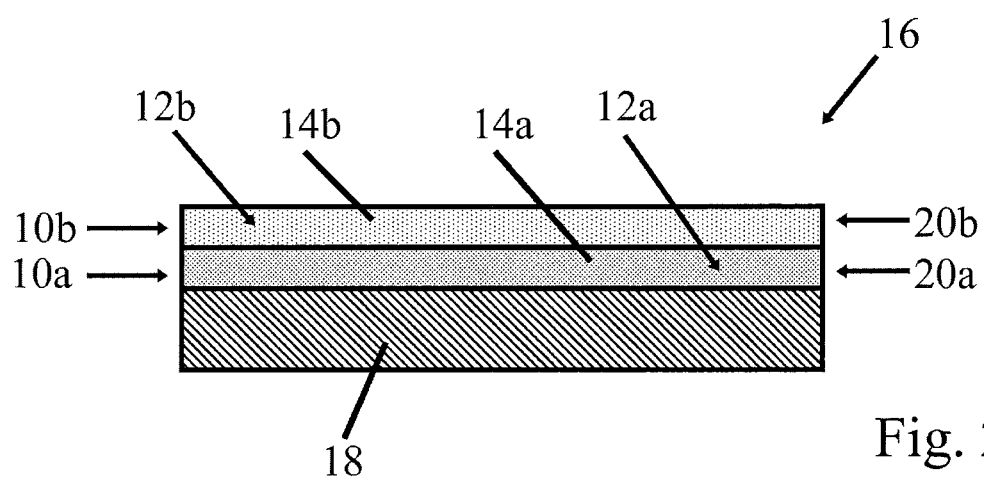
FIG. 2 is a schematic sectional view of a first example of a display device.

FIG. 2 is a schematic sectional view of a first example of a display device 16. The display device 16 comprises a support element 18, on which two layers 20a, 20b are arranged, wherein the layers 20a, 20b each consist of different composite materials 10a, 10b. The composite materials 10a, 10b comprise different photoluminescent materials 12a, 12b embedded in different matrices 14a, 14b to take account of the different refractive indices $n_{Pa}$ and $n_{Pb}$ and ensure that the respective differences relative to the refractive indices $n_{Ma}$ and n respectively of the matrices 14a, 14b amount to at most ±0.2 and preferably at most ±0.01. In principle, however, just one layer 20 may also be provided. The support element 18 may consist of a transparent or a non-transparent material. The support element 18 may, for example, comprise a material from the group comprising glass, silicone, plastics material, in particular polyacrylate, polymethacrylate, polymethyl methacrylate, polycarbonate, epoxy resin, formaldehyde resin, polyacrylonitrile, polyamides, polybutadiene, polyester, polyethene, polyurea, polypropene, polystyrene, polyurethane, polyvinyl chloride and/or polytetrafluoroethylene, ceramics, wood, concrete, stone, metal and/or nonmetallic hybrid polymer materials.

As an alternative to the example shown, further layers may also be provided which consist at least in part of the composite material 10. Two or more layers 20a, 20b . . . may be arranged on different sides of the support element 18. Depending on the arrangement of the layers 20a, 20b and the selection of the support element 18, it is thus possible for the emitted light to have a similar color point on both sides of the display device 16. This is possible in particular if all the photoluminescent materials 12 have been embedded in a single layer 20. It is likewise possible, depending on the arrangement of the layers 20a, 20b and the selection of the support element 18, to emit light with different color points from both sides of the support element 18. At least one of the layers 20a, 20b may be embedded in the support element 18.

The layer thickness of each light-emitting layer 20a, 20b or each composite material 10a, 10b may be very small and, for example, lie in the order of magnitude of 1 mm or less. Thus, the light emission area is substantially two-dimensional in shape. The layer thickness may be selected in accordance with different parameters such as, for example, concentration of the photoluminescent material 12 in the matrix 14 and absorption cross-section of the composite material 10.

In addition to the fronts of buildings, the display device 16 may therefore also be used to equip or replace doors, mirrors, windows and the like. It is also possible to configure or use such a display device 16 as a glass ceiling, a glass floor or a display, in particular a head-up display. The display device 16 may likewise also be used for general lighting, for example, in the form of a window or a lamp, which is at least substantially transparent in the "off" state, but emits light in the excited or switched-on ("on") state.

Furthermore, the upper layer 20b may take the form of an antireflective coating. As a rule, when using dark blue or violet excitation light and when using near UV or UV light, in particular laser light, precautions should be taken to rule out damage to observers' eyes. To improve the safety of the display device 16, the beam direction may be optimized, to prevent reflection. This may be achieved, for example, by an antireflective coating. Alternatively or in addition, the opposite side of the support element 18 from the layer 20a may be coated with an antireflective coating and/or an absorber to ensure that no light of undesired wavelengths and/or an undesired direction of propagation can pass through the display device 16.

Figure 3:
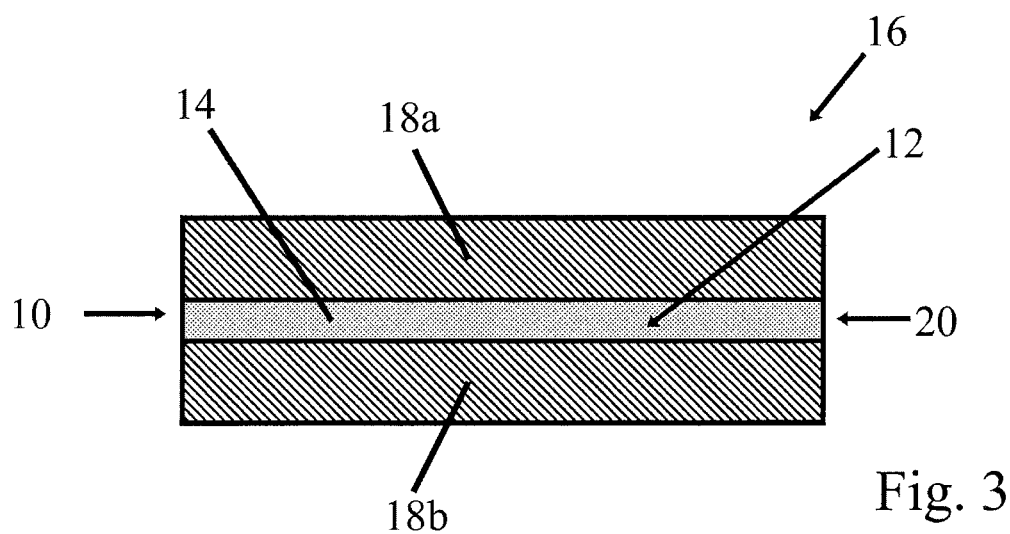
FIG. 3 is a schematic sectional view of a second example of the display device.

FIG. 3 is a schematic sectional view of a second example of the display device 16. Unlike in the preceding example, the display device 16 comprises two support elements 18a, 18b, between which a layer 20 is arranged which consists of a composite material 10. The multilayer structure shown protects the composite material 10 particularly well against environmental influences. In addition, the display device 16 may, for example, be used as a replacement for double glazing. At least one of the support elements 18a, 18b therefore preferably consists of a transparent material such as, for example, glass, ceramics, silicone or acrylic polymer to allow the excitation and emission radiation to pass. Alternatively, provision may be made for the excitation radiation to be injected into the composite material 10 by a light guide (not shown).

Figure 4:
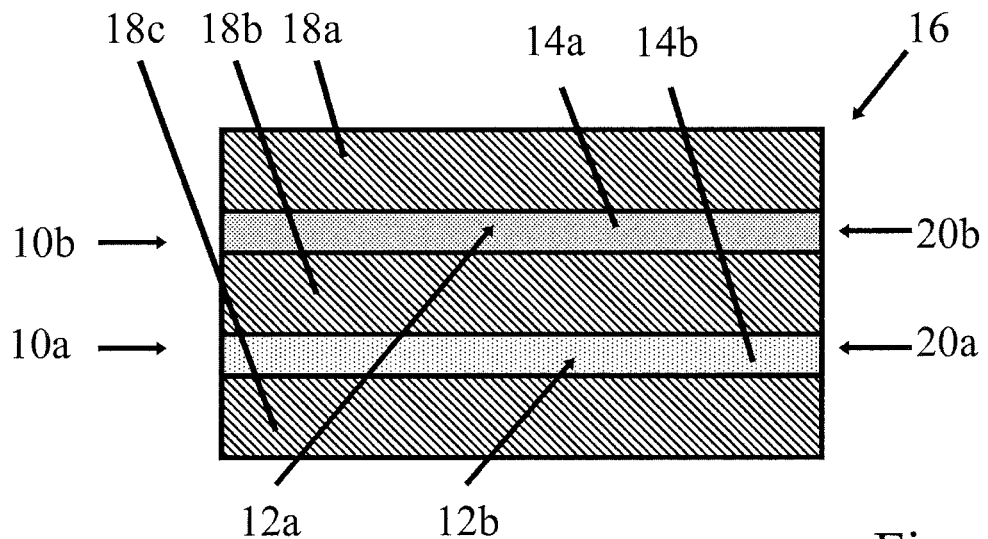
FIG. 4 is a schematic sectional view of a third example of the display device.

FIG. 4 is a schematic sectional view of a third example of the display device 16 configured, unlike in the previous example, as a replacement for triple glazing. To this end, the display device 16 comprises three support elements 18a-c, between which two layers 20a, 20b of respective composite materials 10a, 10b are arranged.

Figure 5:
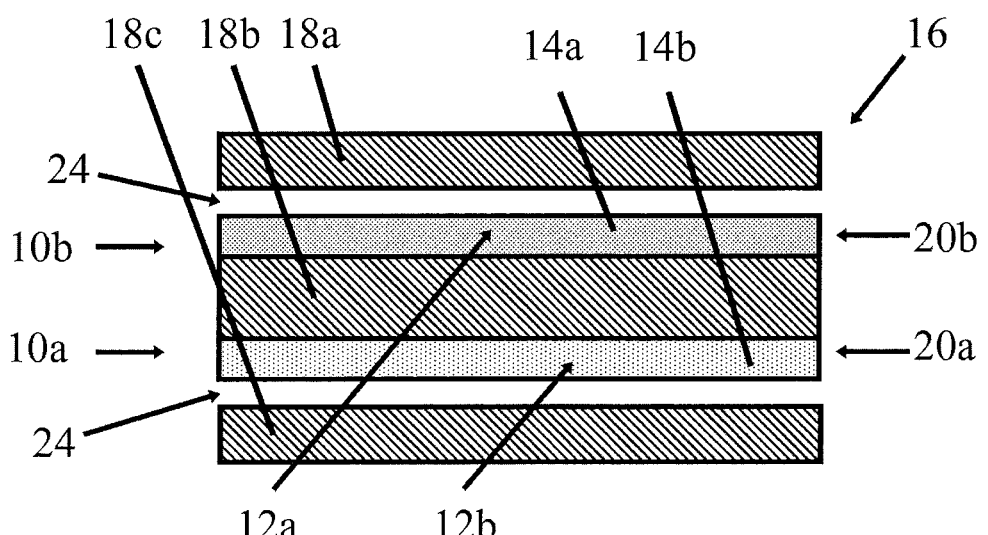
FIG. 5 is a schematic sectional view of a fourth example of the display device.

FIG. 5 is a schematic sectional view of a fourth example of the display device 16. The structure of the display device 16 in this case corresponds substantially to the structure shown in FIG. 4. Unlike in the preceding example, however, respective gaps 24 are formed between the composite materials 10a, 10b and the external support elements 18a, 18c. The gap 24 may in principle be filled with air, a gas, a predetermined gas mixture or an otherwise suitable material. Provision may likewise be made for at least one of the gaps 24 to be evacuated. This enables particularly advantageous light injection with high quantum yield into the middle support element 18b bearing the composite materials 10a, 10b, since injected light of suitable excitation wavelengths is only guided through the support element 18b. Furthermore, with regard to its optical and mechanical properties the display device 16 is particularly insensitive to soiling of and the application of pressure to the external support elements 18a, 18c, for example, by the fingers of an observer.

Figure 6:
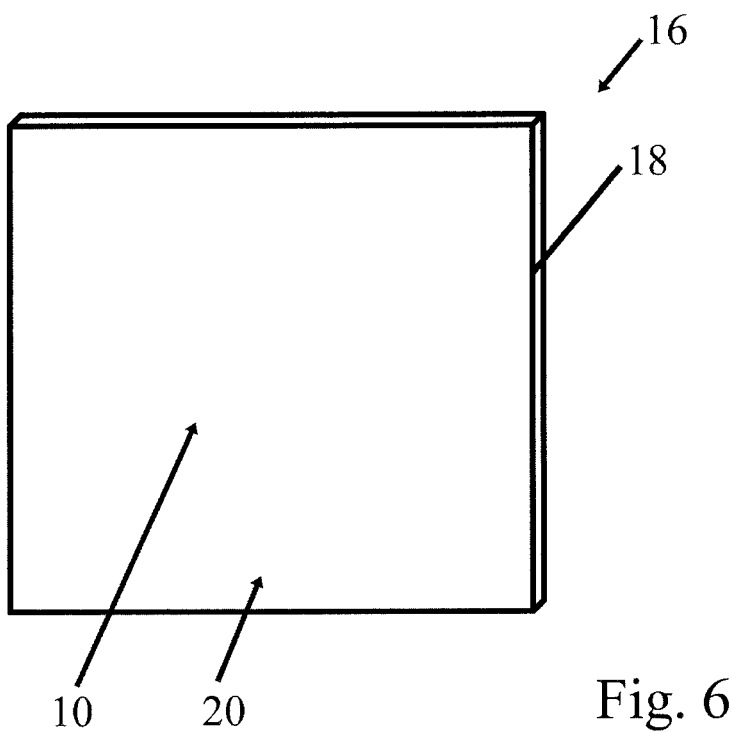
FIG. 6 is a schematic perspective view of a further example of the display device in the switched-off state.

FIG. 6 shows a schematic perspective view of a further example of the display device 16 in the switched-off or unexcited state ("off" state). The display device 16 comprises a transparent support element 18 on which a layer 20 is arranged which consists in part of the composite material 10. It is clear from FIG. 5 that the ability of the display device 16 to display information is not visible in the "off" state due to the transparency, colorlessness and low layer thickness of the layer 20.

Figure 7:
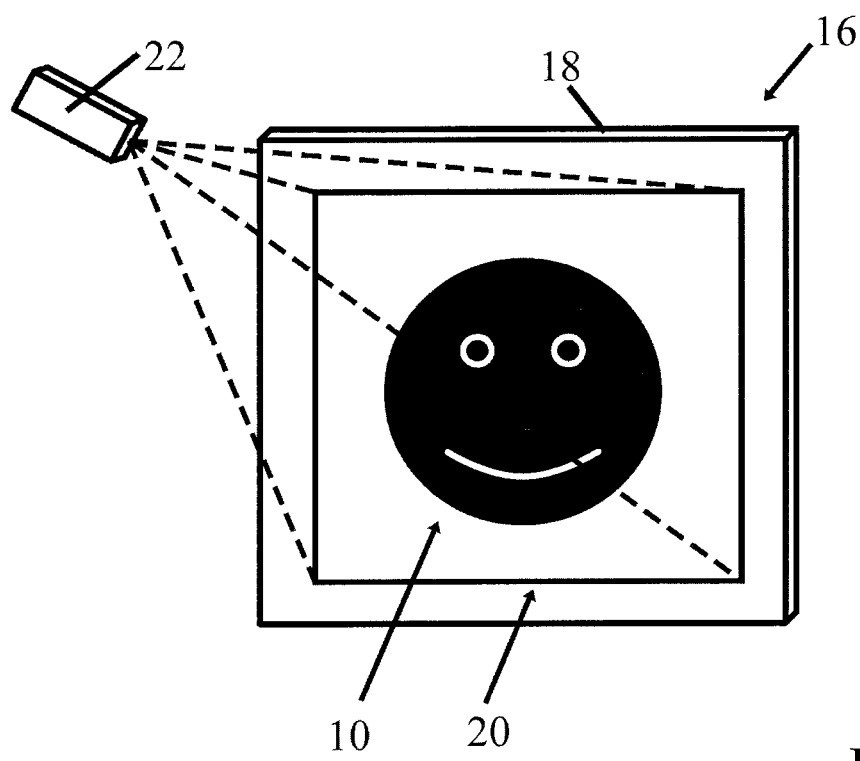
FIG. 7 is a schematic perspective view of the example shown in FIG. 6 of the display device in the switched-on state.

FIG. 7 is a schematic perspective view of the example shown in FIG. 6 of the display device 16 in the switched-on state. It is clear that the entire layer 20 is exposed to excitation radiation by a lighting device 22 of the display device 16 such that the region of the layer 20 provided with the composite material 10 photoluminesces and emits light of a different wavelength. With the assistance of a suitable lighting device 22 for exciting the photoluminescent material(s) 12, the display device 16 may therefore function as a type of display. The size of the display may in this case be virtually freely scaled by modifying the lateral size of the support element 18 or of the composite material 10 and the size of the illuminated area. In principle, of course, multiple lighting devices 22 may also be provided to excite different photoluminescent materials 12 and/or to expose particularly large-area layers 20 to excitation radiation. In this case, preferably, the lighting device 22 may generate excitation light which is not or is barely visible to the human eye such that the excitation light and its origin are not perceptible to an observer.

By using a projector as lighting device 22, i.e. a light source that may specifically and variably illuminate regions of the layer 20, it is possible to display any desired logos, text, animations and the like such that the display device 16 may be used in a similar manner to a display. The luminance of the light emission may be increased by using stronger light exposure or by using multiple lighting devices 22.

Furthermore, by using (ultra) short-range projectors as an open- and/or closed-loop-controllable light source the lighting device 22 may be arranged very close to the layer 20, which is advantageous in terms of controlling the direction of propagation of the excitation light and thus preventing undesired reflection. It is also possible to provide some regions of the layer 20 and/or of the support element 18 with a quencher and/or absorber which mainly absorbs light and does not have any photoluminescence properties. In this case, regions may be generated which appear dark compared with the regions with embedded or light-accessible photoluminescent material 12. Such a quencher and/or absorber may be a phosphor which has been doped with an activator to strongly quench emission radiation. In this way, only specific regions of the display device 16 or of the layer 20 are in a position to emit light such that the light-emitting regions may be particularly precisely defined, for example, in the form of a symbol, a logo, a text and the like. In this case, moreover, no projector is required as a light source, but rather simpler lighting devices 22 such as for instance an expanded laser and/or LEDs, may be used. Instead of such a quencher and/or absorber, it is also possible to use other absorbing materials. It is also possible not to provide regions of the support element 18 with a luminescent layer 20, so that it cannot emit light.

In general, it is possible to use different types of lighting devices 22 for excitation. Examples are lasers, LEDs and conventional light sources that may optionally be provided with a filter to block certain wavelength ranges. In addition to irradiation with light, it is possible to inject light into the layer 20 or into an adjacent light guide layer (not shown). For example, light from a light source may be coupled from the edges of the support element 18 into a light guide. Alternatively, the support element 18 may optionally itself be used as a light guide. If the light is injected from the edges of the layer 20 and the light intensity at the edge is particularly high, it may be advantageous to provide a non-uniform layer 20 on the support element 18 to harmonize overall light emission over the luminescent area. The layer 20 may to this end have a variable thickness, for example. Alternatively or in addition, the concentration of the photoluminescent material 12 and/or of a quencher/absorber may be uneven, for example, lower in the peripheral region and correspondingly higher as a function of distance from the peripheral region or vice versa. It is also possible to block particular directions of propagation of the excitation light and/or of the reflected or scattered light by using a corresponding material such as glass, plastics material and the like that purposefully absorbs the light.

The parameter values defining the process and measurement conditions to characterize specific characteristics of the subject matter herein should also be considered to be included in the scope of this disclosure even in the context of deviations, for example, due to measuring errors, system errors, weighing errors, DIN tolerances and the like.

The invention claimed is:

1. A composite material comprising at least one photoluminescent material embedded as a light source in a transparent matrix,
   wherein a refractive index ($n_P$) of the at least one photoluminescent material and a refractive index ($n_M$) of the matrix differ by at most ±0.2,
   the composite material is transparent in the visible spectral range,
   an absorption maximum of the photoluminescent material lies outside a region of the spectrum visible to a human eye,
   the matrix comprises a filler material comprising particles by which the refractive index ($n_M$) of the matrix is adjusted, and
   at least one of:
   the photoluminescent material consists of particles having an average particle diameter of ≤400 nm and/or an average particle diameter of ≥800 nm, and
   the photoluminescent material comprises at least one inorganic phosphor selected from the group consisting of
   $(M_{1-x}Eu_x)_{10}(PO_4)_6(Cl,F)_2$, in which M is selected from one or more elements from the group Sr, Mg, Ca and Ba and x=0.01-0.12, and the phosphors contain one or both of the elements in the parentheses,
   $M_{1-y}Eu_yMgAl_{10}O_{17}$, in which M is selected from one or more elements from the group Ba, Mg, Ca and Sr and y=0.01-0.9,
   $(M_{1-p}Eu_p)_6BP_5O_{20}$, in which M is selected from one or more elements from the group Sr, Mg, Ca and Ba and p=0.01-0.9,
   $(Sr_{1-q}Eu_q)_4Al_{14}O_{25}$, in which q=0.01-0.9,
   $Mg_4Ge_{1-r}Mn_r(O,F)_6$, in which r=0.001-0.06 and the formula can contain one or both of the elements in the parentheses, and
   $M_{1-s}Eu_s(Mg_{1-t}Mn_t)Al_{10}O_{17}$, in which M is selected from one or more elements from the group Ba, Mg, Ca and Sr, s=0.01-0.7 and t=0.05-0.5.

2. The composite material according to claim 1, wherein the at least one photoluminescent material further comprises at least one of organic phosphors and quantum dots.

3. The composite material according to claim 1, wherein the matrix comprises glass, silicone, plastics material.

4. The composite material according to claim 1, wherein the matrix comprises at least one material selected from the group consisting of polyacrylate, polymethacrylate, polymethyl methacrylate, polycarbonate, epoxy resin, formaldehyde resin, polyacrylonitrile, polyamides, polybutadiene, polyester, polyethene, polyurea, polypropene, polystyrene, polyurethane, polyvinyl chloride, polytetrafluoroethylene, ceramics and a nonmetallic hybrid polymer material.

5. A display device with at least one support element comprising at least one composite material as a layer or constituent of a layer, wherein the composite material comprises at least one photoluminescent material embedded as a light source in a transparent matrix, and a refractive index ($n_P$) of the at least one photoluminescent material and a refractive index ($n_M$) of the matrix differ by at most ±0.2.

6. A method of operating the display device according to claim 5, comprising exposing the composite material arranged as a layer or constituent of a layer on the support element to electromagnetic radiation comprising at least one excitation wavelength of the photoluminescent material embedded as a light source in the transparent matrix.

7. The display device according to claim 5, wherein the support element comprises at least one material from the group comprising glass, silicone, plastics material.

8. The display device according to claim 5, comprising at least two support elements.

9. The display device according to claim 5, comprising at least two layers consisting at least in part of one or more composite materials comprising at least one photoluminescent material embedded as a light source in a transparent matrix, wherein a refractive index ($n_P$) of the at least one photoluminescent material and a refractive index ($n_M$) of the matrix differ by at most ±0.2, wherein the at least two layers are arranged next to one another and/or above one another and/or on opposing sides of a support element and/or on different support elements.

10. The display device according to claim 5, wherein at least one quencher and/or absorber is provided by which light of the excitation wavelength(s) and/or the emission wavelength(s) of at least one photoluminescent material is to be absorbed, and/or at least one layer takes the form of an antireflective coating.

11. The display device according to claim 5, further comprising means for injecting light into the photoluminescent material and/or at least one open- and/or closed-loop-controllable lighting device by which the photoluminescent material is to be excited.

12. The display device according to claim 5, wherein the lighting device comprises at least one projector and/or at least one laser and/or at least one LED and/or is configured to emit light of different wavelengths.

13. The display device according to claim 5, wherein the support element comprises at least one material selected from the group consisting of polyacrylate, polymethacrylate, polymethyl methacrylate, polycarbonate, epoxy resin, formaldehyde resin, polyacrylonitrile, polyamides, polybutadiene, polyester, polyethene, polyurea, polypropene, polystyrene, polyurethane, polyvinyl chloride, polytetrafluoroethylene, ceramics, wood, concrete, stone, metal and nonmetallic hybrid polymer materials.

* * * * *